United States Patent
Li et al.

(10) Patent No.: US 11,972,612 B2
(45) Date of Patent: Apr. 30, 2024

(54) TECHNIQUES TO AUTOMATICALLY VERIFY OBJECT DETECTION, CLASSIFICATION, AND DEPTH FOR AUTOMATED DRIVING SYSTEMS

(71) Applicants: Dalong Li, Troy, MI (US); Neil Garbacik, Lake Orion, MI (US)

(72) Inventors: Dalong Li, Troy, MI (US); Neil Garbacik, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 326 days.

(21) Appl. No.: 17/178,865

(22) Filed: Feb. 18, 2021

(65) Prior Publication Data

US 2022/0261582 A1 Aug. 18, 2022

(51) Int. Cl.
| | |
|---|---|
| G06V 20/56 | (2022.01) |
| G03B 21/14 | (2006.01) |
| G06F 18/21 | (2023.01) |
| G06T 7/33 | (2017.01) |
| G06T 7/73 | (2017.01) |
| G06T 7/80 | (2017.01) |
| G06V 10/75 | (2022.01) |

(52) U.S. Cl.
CPC .......... *G06V 20/56* (2022.01); *G03B 21/145* (2013.01); *G06F 18/217* (2023.01); *G06T 7/337* (2017.01); *G06T 7/74* (2017.01); *G06T 7/80* (2017.01); *G06V 10/7557* (2022.01)

(58) Field of Classification Search
None
See application file for complete search history.

(56) References Cited

U.S. PATENT DOCUMENTS

| | | | | |
|---|---|---|---|---|
| 11,117,570 | B1* | 9/2021 | Broggi | G06V 20/59 |
| 11,334,762 | B1* | 5/2022 | Wrenninge | G06F 18/214 |
| 11,373,411 | B1* | 6/2022 | Goh | G06T 7/337 |
| 2008/0129544 | A1* | 6/2008 | Augst | B62D 15/0285 |
| | | | | 340/932.2 |
| 2010/0289632 | A1* | 11/2010 | Seder | G06V 10/95 |
| | | | | 382/104 |
| 2010/0292886 | A1* | 11/2010 | Szczerba | G01S 13/723 |
| | | | | 701/31.4 |
| 2017/0219706 | A1* | 8/2017 | Baldischweiler | G01S 17/04 |

(Continued)

OTHER PUBLICATIONS

Ramanagopal, Manikandasriram Srinivasan, et al., "Failing to Learn: Autonomously Identifying Perception Failures for Self-Driving Cars", IEEE Robotics and Automation Letters, Preprint Version, 8 pages, Jul. 2018.

*Primary Examiner* — Soo Shin
(74) *Attorney, Agent, or Firm* — Jeremy J. Klobucar

(57) ABSTRACT

An object detection and classification verification system for a vehicle includes a projection system configured to project a three-dimensional (3D) scene pre-captured at a known distance and comprising at least one known object onto a surface in front of the vehicle a controller configured to verify a performance of an object detection and classification routine by performing the object detection and classification routine on the projected 3D scene to generate a set of results, comparing the set of results to a set of expected results associated with the projected 3D scene, and based on the comparing, determining whether the performance of the object detection and classification routine satisfies a predetermined threshold metric.

20 Claims, 3 Drawing Sheets

(56) References Cited

U.S. PATENT DOCUMENTS

| | | | |
|---|---|---|---|
| 2018/0029641 A1* | 2/2018 | Solar | B62D 15/028 |
| 2018/0079463 A1* | 3/2018 | Pearce | B62J 45/412 |
| 2019/0079525 A1* | 3/2019 | Towal | G05D 1/0285 |
| 2019/0317519 A1* | 10/2019 | Chen | G06T 7/344 |
| 2020/0026282 A1* | 1/2020 | Choe | B60W 60/001 |
| 2022/0091414 A1* | 3/2022 | Cappuccilli | B60J 1/001 |

* cited by examiner

TECHNIQUES TO AUTOMATICALLY VERIFY OBJECT DETECTION, CLASSIFICATION, AND DEPTH FOR AUTOMATED DRIVING SYSTEMS

FIELD

The present application generally relates to autonomous vehicles and, more particularly, to techniques for automatically verifying object detection, classification, and depth for automated driving systems.

BACKGROUND

Some vehicles are equipped with an advanced driver assistance (ADAS) or autonomous driving system that is configured to perform object detection and classification. The performance of the object detection and classification systems and methods needs to be checked and verified over time to ensure proper functionality/performance. One conventional way to test or verify the performance of these object detection and classification systems and methods is to setup a physical scene (e.g., vehicles and/or dummies) and compare the outputs of the object detection and classification systems and methods to the expected results. This is expensive and time-consuming process and offers only limited test scenarios. Accordingly, while such conventional vehicle object detection and classification verification techniques do work well for their intended purpose, there exists an opportunity for improvement in the relevant art.

SUMMARY

According to one example aspect of the invention, an object detection and classification verification system for a vehicle is presented. In one exemplary implementation, the verification system comprises a projection system configured to project onto a surface in front of the vehicle and a controller of the vehicle in communication with the projection system, the controller being configured to verify a performance of an object detection and classification routine by commanding the projection system to project one of a plurality of three-dimensional (3D) scenes onto the surface in front of the vehicle, wherein each of the plurality of 3D scenes is pre-captured at a known distance and comprises at least one known object, performing the object detection and classification routine on the particular projected 3D scene to generate a set of results, comparing the set of results to a set of expected results associated with the projected 3D scene, and based on the comparing, determining whether the performance of the object detection and classification routine satisfies a predetermined threshold metric.

In some implementations, the set of results comprises a detected location and detected class for each object in the projected 3D scene, and wherein the set of expected results comprises a known location and known class for each object in the 3D scene. In some implementations, each of the plurality of 3D scenes further comprises a two-dimensional (2D) box having a size corresponding to the known distance.

In some implementations, the controller is further configured to output instructions to move the vehicle towards or away from the surface until the size of the 2D box in the projected 3D scene matches the size corresponding to the known distance. In some implementations, the controller is further configured to output instructions to move the vehicle left or right relative to the surface until there is no projection distortion of the 2D box in the projected 3D scene.

In some implementations, the set of results comprises a detected depth for each object in the projected 3D scene, and wherein the set of expected results comprises a known depth for each object in the 3D scene. In some implementations, the object detection and classification routine is verified, modified, or disabled based on whether the performance of the object detection and classification routine satisfies a threshold metric.

In some implementations, the projection system comprises a standalone projector that is configured to be temporarily connected to the vehicle. In some implementations, the projection system comprises a projector that is integrated into the vehicle. In some implementations, the projector is integrated into a headlight or windshield of the vehicle.

According to another example aspect of the invention, an object detection and classification verification method for a vehicle is presented. In one exemplary implementation, the method comprises providing a projection system configured to project onto a surface in front of the vehicle and verifying, by a controller of the vehicle in communication with the projection system, a performance of an object detection and classification routine by commanding, by the controller, the projection system to project one of a plurality of 3D scenes onto the surface in front of the vehicle, wherein each of the plurality of 3D scenes is pre-captured at a known distance and comprises at least one known object, performing, by the controller, the object detection and classification routine on the particular projected 3D scene to generate a set of results, comparing, by the controller, the set of results to a set of expected results associated with the projected 3D scene, and based on the comparing, determining, by the controller, whether the performance of the object detection and classification routine satisfies a predetermined threshold metric.

In some implementations, the set of results comprises a detected location and detected class for each object in the projected 3D scene, and wherein the set of expected results comprises a known location and known class for each object in the 3D scene. In some implementations, each of the plurality of 3D scenes further comprises a 2D box having a size corresponding to the known distance.

In some implementations, the method further comprises outputting, by the controller, instructions to move the vehicle towards or away from the surface until the size of the 2D box in the projected 3D scene matches the size corresponding to the known distance. In some implementations, the method further comprises outputting, by the controller, instructions to move the vehicle left or right relative to the surface until there is no projection distortion of the 2D box in the projected 3D scene.

In some implementations, the set of results comprises a detected depth for each object in the projected 3D scene, and wherein the set of expected results comprises a known depth for each object in the 3D scene. In some implementations, the method further comprises verifying, modifying, or disabling the object detection and classification routine based on whether the performance of the object detection and classification routine satisfies a threshold metric.

In some implementations, the projection system comprises a standalone projector that is configured to be temporarily connected to the vehicle. In some implementations, the projection system comprises a projector that is integrated into the vehicle. In some implementations, the projector is integrated into a headlight or windshield of the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As discussed above, one conventional way to test or verify the performance of vehicle object detection and classification systems and methods is to setup a physical scene (e.g., vehicles and/or dummies) and compare the outputs of the object detection and classification systems and methods to the expected results. This is expensive and time-consuming process and offers only limited test scenarios.

Accordingly, improved vehicle object detection and classification verification techniques are presented. These techniques utilize a projection system to project a three-dimensional (3D) scene onto a surface in front of the vehicle. This projected 3D scene is analyzed by the object detection/classification technique of the vehicle and its outputs are compared to expected results. In some embodiments, pre-processing is performed to determine whether the surface is appropriate for 3D scene projection (e.g., of sufficient color/quality, no keystone effect, etc.). In some cases, these techniques are limited to a special vehicle service environment. The projection system could be any suitable integrated or standalone projection system, such as a standalone projector or a projected integrated into a headlight or windshield of the vehicle. In some embodiments, a two-dimensional (2D) box is part of the projected 3D scene, which can be utilized for depth verification.

Figure 1:
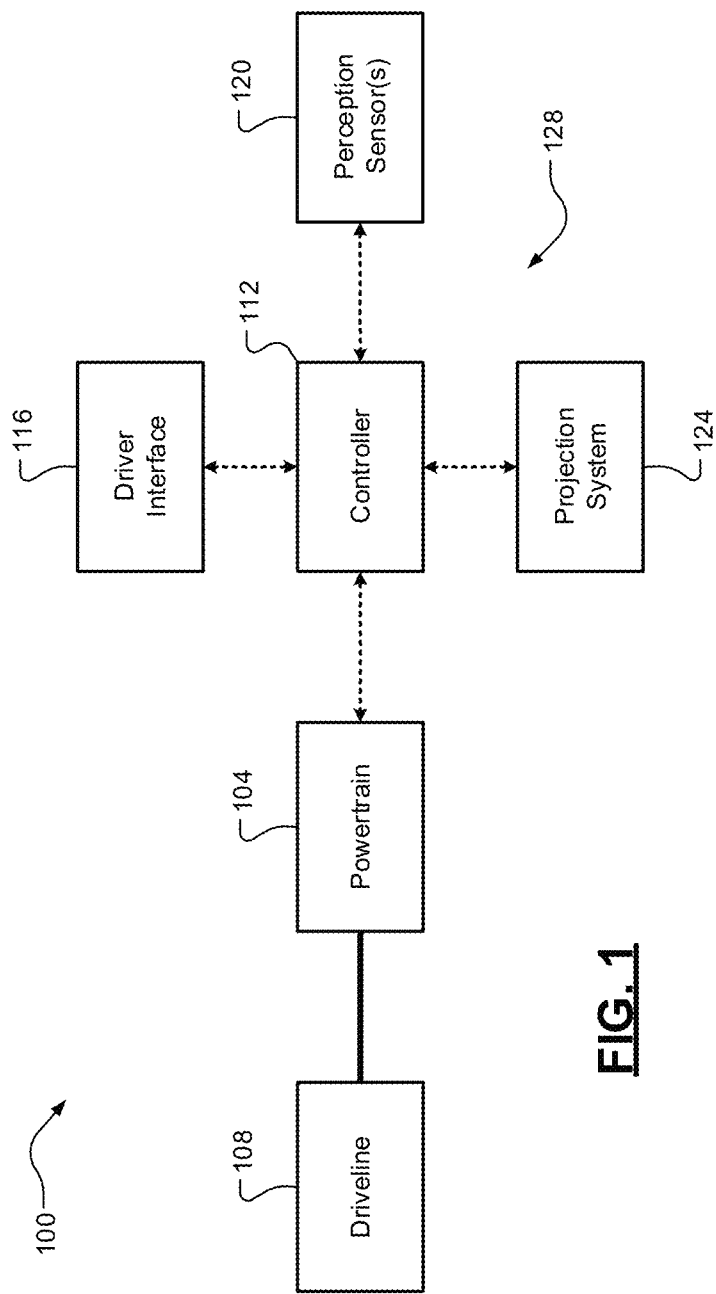
FIG. 1 is a functional block diagram of a vehicle having an example object detection and classification verification system according to the principles of the present application.

Referring now to FIG. 1, a functional block diagram of a vehicle 100 comprising an example object detection and classification verification system according to the principles of the application is illustrated. The vehicle 100 comprises a powertrain 104 (an engine, an electric motor, combinations thereof, etc.) that generates and transfers drive torque to a driveline 108 for vehicle propulsion. A controller 112 controls operation of the vehicle 100, such as controlling the powertrain 104 to generate a desired amount of drive torque based on a driver torque request received via a driver interface 116. The controller 112 also receives information from a suite of one or more perception sensors 120 as part of advanced driver assistance (ADAS) and/or autonomous driving feature operation. This could include, for example, an object detection and classification routine as part of an ADAS or autonomous driving feature of the vehicle 100. Non-limiting examples of the perception sensor(s) 120 include cameras, RADAR, and LIDAR systems, but it will be appreciated that the perception sensor(s) that are most relevant to the verification techniques of the present disclosure are image-based perception sensor(s) such as cameras.

Figure 2:
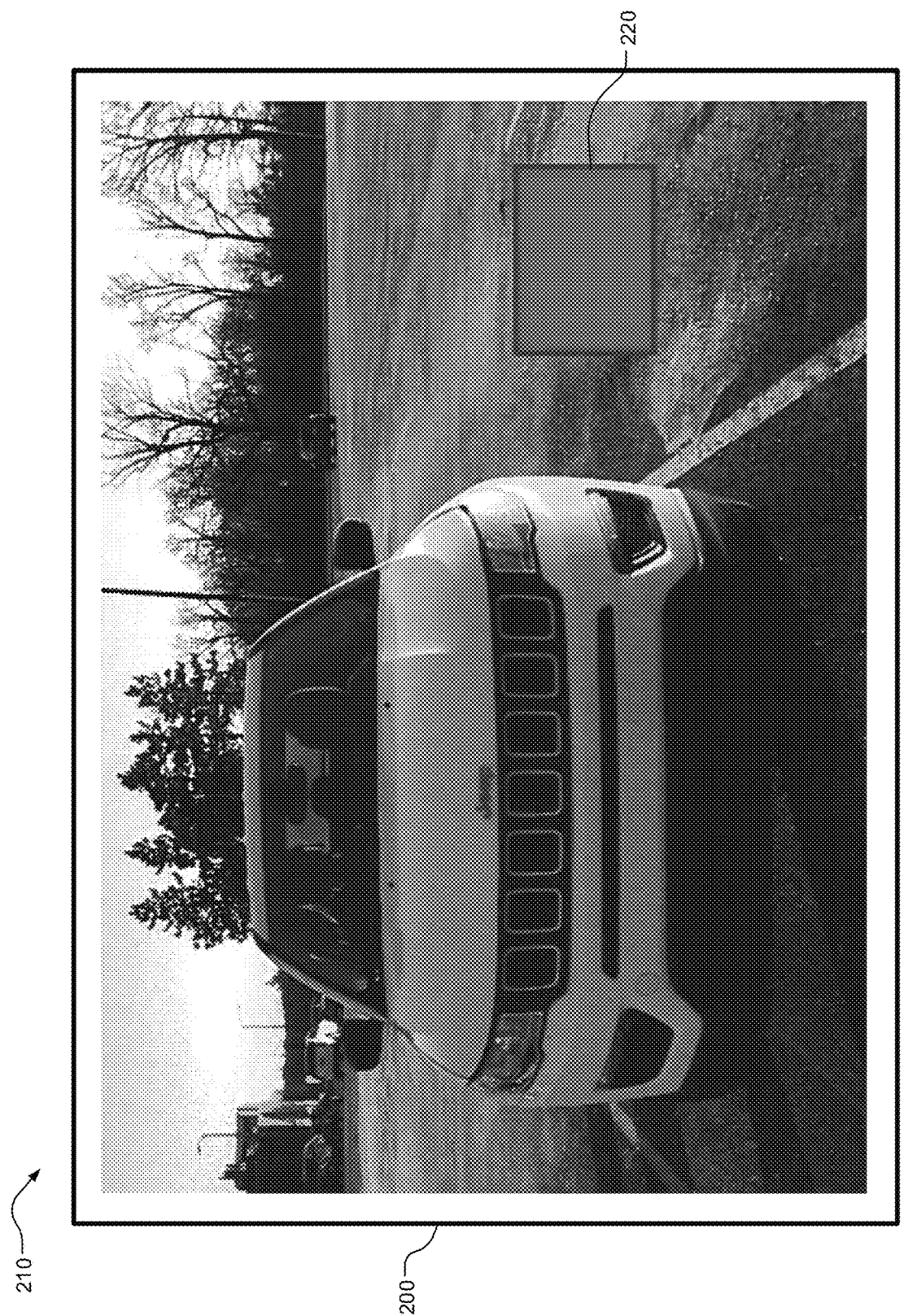
FIG. 2 is an example projected three-dimensional (3D) scene including a two-dimensional (2D) box onto a surface by the example object detection and classification verification system according to the principles of the present application.

Referring now to FIG. 2 and with continued reference to FIG. 1, the vehicle 100 comprises or is otherwise associated with a projection system 124 that, in conjunction with the controller 112 of the vehicle 100, form the object detection and classification verification system 128 according to the principles of the present application. The projection system 124 is configured to project onto a surface 200 in front of the vehicle 100. In one exemplary implementation, the projection system 124 comprises a standalone projector that is configured to be temporarily connected to the vehicle 100. For example only, the verification techniques of the present disclosure could be limited to a controlled vehicle service environment, but it will be appreciated that these verification techniques could also be executed periodically outside of a controlled vehicle service environment (e.g., in the vehicle owner's garage). in another exemplary implementation, the projection system 124 comprises a projector that is integrated into the vehicle 100, such as in a headlight or windshield of the vehicle 100. For example only, the projector could be a light-emitting diode (LED) based projector system integrated into the vehicle headlight.

The controller 112 is configured to command the projection system 124 to project one of a plurality of 3D scenes onto the surface 200 in front of the vehicle 100. Each of the plurality of 3D scenes is pre-captured at a known distance and comprises at least one known object. This allows for easy capturing of a variety of different 3D scenes, and also provides for the ability to inject noise or other attributes into the projected 3D scene to better test the robustness of the object detection and classification routine. In the illustrated example of FIG. 2, the projected 3D scene 210 comprises a plurality of known objects each having a known classification.

These objects include, for example, near and far vehicles, buildings, poles, lane markers, trees, and the like. The projected 3D scene was also pre-captured at a known distance. The projected 3D scene therefore further comprises a 2D box 220 for depth verification purposes. While 2D boxes (squares, rectangles, etc.) are explicitly shown and discussed herein, it will be appreciated that another 2D marker could be utilized. This depth verification includes, for example, detecting the 2D box 220 and comparing its size to an expected size. The vehicle 100 could then be moved forward or backwards (e.g., in response to generated instructions) until a size match is determined thereby verifying depth.

Figure 3:
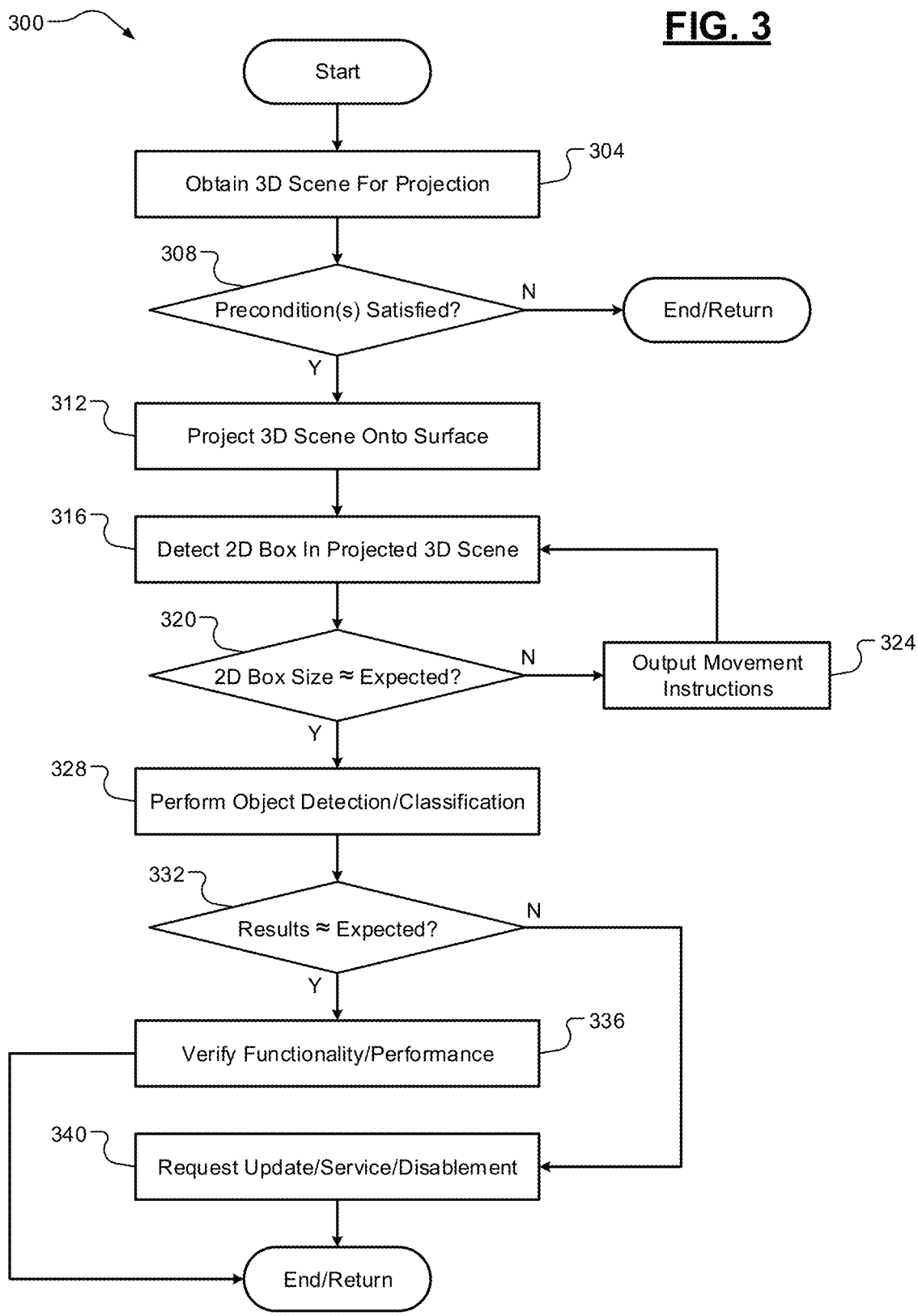
FIG. 3 is a flow diagram of an example object detection and classification verification method for a vehicle according to the principles of the present application.

Referring now to FIG. 3 and with continued reference to FIGS. 1-2, a flow diagram of an example object detection and classification verification method 300 according to the principles of the present application is illustrated. At 304, one of a plurality of 3D scenes is obtained for projection. The plurality of 3D scenes could be stored in memory locally or remotely (e.g., at an OEM-controlled server) and could be continuously updated over time to create capture new 3D scenes. At optional 308, it is determined whether a set of one or more preconditions are satisfied. This could include, for example only, determining whether the vehicle 100 is in a controller service environment. This could also include, for example only, determining that the surface 200 is of sufficient quality for projection and object detection/classification routine verification purposes.

When these precondition(s) are satisfied, the method 300 proceeds to 312. Otherwise, the method 300 ends or returns to 304. At 312, the controller 112 commands the projection system 124 to project the 3D scene onto the surface 200 in front of the vehicle 100. At 316, the controller 112 detects the 2D box 220 in the projected 3D scene 210. This could include, for example, utilizing some of the perception sensor (s) 120 (e.g., a camera) to capture an image and analyze it to detect the 2D box 220. At 320, it is determined whether the size of the 2D box 220 is as expected (e.g., within a threshold amount from an expected size).

At 320, checking for any keystone effect could also be performed. More specifically, when the projection system 124 is head-on or perpendicular to the surface 200, there will be no keystone effect (i.e., no projection distortion). However, if the projection system 124 is projecting at an angle relative to the surface 200, there will be distortion present. For example, the 2D box 220 will have a distorted shape that can be detected and subsequent instructions could be provided as to how to adjust the vehicle 100 (turn left, turn right, etc.) such that the projection system 124 is projecting head-on towards the surface 200. In some implementations, a border around a perimeter of the projected 3D scene could be added and utilized for distortion detection and correction.

When the size of the 2D box 220 is not as expected and/or when distortion is detected, instructions are output (e.g., via the driver interface 116) at 324 to move the vehicle 100 forward/backwards and/or left/right and the process repeats (the method 300 returns to 316). When the size of the 2D box 220 satisfies the expected size requirements and no distortion is detected, the method 300 proceeds to 328. At 328, the controller 112 performs the object detection and classification routine on the projected 3D scene 210. As previously mentioned, this involves utilizing some of the perception sensor(s) 120 (e.g., a camera) to capture an image and analyze it to detect and classify object(s) in the projected 3D scene 210. The detected objects and their classes collectively form a set of results, which is compared to a set of expected results at 332.

When the set of results matches or is acceptably close to the set of expected results, the method 300 proceeds to 336 where the object detection/classification functionality or performance is verified and normal operation can continue. The method 300 then ends or returns to 304 for another cycle (e.g., another 3D scene projection and verification cycle). When the set of results is outside of an acceptable range from the set of expected results, remedial action is taken at 340. This could include, requesting updating/servicing of the vehicle 100 and, in some cases, partially or fully disabling ADAS/autonomous driving features that utilize the object detection and classification routine until its functionality/performance can be subsequently verified. The method 300 then ends or returns to 304 for another verification cycle.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An object detection and classification verification system for a vehicle, the verification system comprising:
 a projection system configured to project visible light onto a wall surface in front of the vehicle, wherein the wall surface is substantially perpendicular to a ground surface beneath the vehicle; and
 a controller of the vehicle in communication with the projection system, the controller being configured to verify a performance of an object detection and classification routine by:
  commanding the projection system to project one of a plurality of three-dimensional (3D) scenes onto the wall surface in front of the vehicle, wherein each of the plurality of 3D scenes is pre-captured at a known distance and comprises at least one known object;
  performing the object detection and classification routine on the projected 3D scene to generate a set of results;
  comparing the set of results to a set of expected results associated with the projected 3D scene; and
  based on the comparing, determining whether the performance of the object detection and classification routine satisfies a predetermined threshold metric.

2. The verification system of claim 1, wherein the set of results comprises a detected location and detected class for each object in the projected 3D scene, and wherein the set of expected results comprises a known location and known class for each object in the 3D scene.

3. The verification system of claim 2, wherein each of the plurality of 3D scenes further comprises a two-dimensional (2D) box having a size corresponding to the known distance.

4. The verification system of claim 3, wherein the controller is further configured to at least one of:
 output instructions to move the vehicle towards or away from the wall surface until the size of the 2D box in the projected 3D scene matches the size corresponding to the known distance; and
 output instructions to move the vehicle left or right relative to the wall surface until there is no projection distortion of the 2D box in the projected 3D scene.

5. The verification system of claim 4, wherein the set of results comprises a detected depth for each object in the projected 3D scene, and wherein the set of expected results comprises a known depth for each object in the 3D scene.

6. The verification system of claim 1, wherein the object detection and classification routine is verified, modified, or disabled based on whether the performance of the object detection and classification routine satisfies a threshold metric.

7. The verification system of claim 1, wherein the projection system comprises a standalone projector that is configured to be temporarily connected to the vehicle.

8. The verification system of claim 1, wherein the projection system comprises a projector that is integrated into the vehicle.

9. The verification system of claim 8, wherein the projector is integrated into a headlight or windshield of the vehicle.

10. The verification system of claim 1, wherein the wall surface is a garage wall or a vehicle service center wall.

11. An object detection and classification verification method for a vehicle, the method comprising:

providing a projection system configured to project visible light onto a wall surface in front of the vehicle, wherein the wall surface is substantially perpendicular to a ground surface beneath the vehicle; and verifying, by a controller of the vehicle in communication with the projection system, a performance of an object detection and classification routine by:

commanding, by the controller, the projection system to project one of a plurality of three-dimensional (3D) scenes onto the wall surface in front of the vehicle, wherein each of the plurality of 3D scenes is pre-captured at a known distance and comprises at least one known object;

performing, by the controller, the object detection and classification routine on the projected 3D scene to generate a set of results;

comparing, by the controller, the set of results to a set of expected results associated with the projected 3D scene; and based on the comparing, determining, by the controller, whether the performance of the object detection and classification routine satisfies a predetermined threshold metric.

12. The method of claim 11, wherein the set of results comprises a detected location and detected class for each object in the projected 3D scene, and wherein the set of expected results comprises a known location and known class for each object in the 3D scene.

13. The method of claim 12, wherein each of the plurality of 3D scenes further comprises a two-dimensional (2D) box having a size corresponding to the known distance.

14. The method of claim 13, further comprising at least one of:

outputting, by the controller, instructions to move the vehicle towards or away from the wall surface until the size of the 2D box in the projected 3D scene matches the size corresponding to the known distance; and outputting, by the controller, instructions to move the vehicle left or right relative to the wall surface until there is no projection distortion of the 2D box in the projected 3D scene.

15. The method of claim 14, wherein the set of results comprises a detected depth for each object in the projected 3D scene, and wherein the set of expected results comprises a known depth for each object in the 3D scene.

16. The method of claim 11, further comprising verifying, modifying, or disabling the object detection and classification routine based on whether the performance of the object detection and classification routine satisfies a threshold metric.

17. The method of claim 11, wherein the projection system comprises a standalone projector that is configured to be temporarily connected to the vehicle.

18. The method of claim 11, wherein the projection system comprises a projector that is integrated into the vehicle.

19. The method of claim 18, wherein the projector is integrated into a headlight or windshield of the vehicle.

20. The method of claim 11, wherein the wall surface is a garage wall or a vehicle service center wall.

* * * * *